United States Patent
Song et al.

(10) Patent No.: US 10,884,234 B2
(45) Date of Patent: Jan. 5, 2021

(54) EYEPIECE AND DISPLAY DEVICE INCLUDING EYEPIECE

(71) Applicant: Zhejiang Sunny Optical Co., Ltd, Zhejiang (CN)

(72) Inventors: Litong Song, Zhejiang (CN); Lin Huang, Zhejiang (CN)

(73) Assignee: ZHEJIANG SUNNY OPTICAL CO., LTD., Ningbo (CN)

( * ) Notice: Subject to any disclaimer, the term of this patent is extended or adjusted under 35 U.S.C. 154(b) by 160 days.

(21) Appl. No.: 16/211,863

(22) Filed: Dec. 6, 2018

(65) Prior Publication Data
US 2019/0107708 A1     Apr. 11, 2019

Related U.S. Application Data

(63) Continuation of application No. PCT/CN2018/072775, filed on Jan. 16, 2018.

(30) Foreign Application Priority Data

Jul. 14, 2017   (CN) .......................... 2017 1 0573783
Jul. 14, 2017   (CN) ...................... 2017 2 0853733 U

(51) Int. Cl.
*G02B 25/00*         (2006.01)
*G02B 27/00*         (2006.01)
(Continued)

(52) U.S. Cl.
CPC ............. *G02B 25/001* (2013.01); *G02B 3/04* (2013.01); *G02B 3/08* (2013.01); *G02B 27/0025* (2013.01);
(Continued)

(58) Field of Classification Search
CPC .................. G02B 25/00; G02B 25/001; G02B 2003/0093; G02B 3/02; G02B 3/04;
(Continued)

(56) References Cited

U.S. PATENT DOCUMENTS

2017/0153455 A1     6/2017  Takahashi
2017/0336539 A1*   11/2017  Perreault .................. G02B 3/08
(Continued)

FOREIGN PATENT DOCUMENTS

CN        106019567        10/2016
CN        106291940         1/2017
(Continued)

OTHER PUBLICATIONS

Gross "Handbook of Optical Systems" Wiley, 2007, pp. 377-378 (Year: 2007).*

*Primary Examiner* — Marin Pichler
(74) *Attorney, Agent, or Firm* — Hauptman Ham, LLP

(57) ABSTRACT

The present disclosure provides an eyepiece and a display device including the eyepiece. The eyepiece includes a lens. The lens has a first surface and a second surface opposite to the first surface. The first surface is a corresponding surface of an eye side, and the second surface is a corresponding surface of a display element side. In addition, the first surface is a Fresnel structure surface, and the second surface is an aspheric curved surface. The Fresnel structure surface includes multiple annular sections arranged in sequence to form a serrated surface. An effective focal length EFL of the lens satisfies: 35 mm<EFL<45 mm.

17 Claims, 4 Drawing Sheets

(51) Int. Cl.
 *G02B 3/08* (2006.01)
 *G02B 27/01* (2006.01)
 *G02B 3/04* (2006.01)

(52) U.S. Cl.
 CPC ..... *G02B 27/0081* (2013.01); *G02B 27/0172* (2013.01)

(58) Field of Classification Search
 CPC .......... G02B 3/06; G02B 3/08; G02B 5/1876; G02B 27/0025; G02B 27/0081; G02B 27/0101; G02B 27/017; G02B 27/0172; G02B 2027/015
 USPC ................................................ 359/643–647
 See application file for complete search history.

(56) References Cited

U.S. PATENT DOCUMENTS

2018/0088314 A1 3/2018 Jhang et al.
2018/0299660 A1* 10/2018 Song ........................ G02B 3/08

FOREIGN PATENT DOCUMENTS

| CN | 106405820 | 2/2017 |
| JP | 10161042 A | 6/1998 |
| JP | 2013-109101 | 6/2013 |

* cited by examiner

EYEPIECE AND DISPLAY DEVICE INCLUDING EYEPIECE

CROSS-REFERENCE TO RELATED APPLICATIONS

This application is a continuation of International Application. No. PCT/CN2018/072775, filed on. Jan. 16, 2018, which claims the priorities and rights of Chinese Patent Application No. 201710573783.6 and Chinese Patent Application No. 201720853733.9 filed with the China National Intellectual Property Administration (CNIPA) on Jul. 14, 2017. All of the aforementioned applications are hereby incorporated by reference in their entireties.

TECHNICAL FIELD

The present disclosure relates to an eyepiece, and more specifically to an eyepiece for use in a head-mounted display device. The head-mounted display device may be, for example, a head-mounted virtual reality (VR) display device. The present disclosure also relates to a display device equipped with the eyepiece.

BACKGROUND

In recent years, as the computer technology develops rapidly, virtual reality (VR) gradually matures and improves, and the application of VR in professional and consumer fields is also increasing. The VR eyepiece, used as the core optical element of a head-mounted display device, directly affects the application and experience result of the device. Therefore, the requirements on the image quality and the appearance quality of the eyepiece are high.

The head-mounted eyepiece system and the head-mounted display device proposed in the existing technology can correct aberrations while obtaining a wide field-of-view, thereby ensuring viewing experience with a wide viewing angle. In order to satisfy an increasingly higher market demand, the miniaturization and high image quality characteristics of the eyepiece system of the existing technology may still be further optimized.

SUMMARY

The object of the present disclosure includes providing a miniaturized eyepiece to allow an effective correction of system spherical aberrations and chromatic aberrations, improve an image quality, and at the same time meet the requirements on miniaturization and lightness and thinness of the VR eyepiece.

In an aspect of the present disclosure, an eyepiece is provided. The eyepiece includes a lens. The lens has a first surface corresponding to an eye side and a second surface opposite to the first surface. The first surface is a Fresnel structure surface, and the second surface is an aspheric curved surface. The Fresnel structure surface may include multiple annular sections arranged in sequence to form a serrated surface. An effective focal length EFL of the lens may satisfy: 3.5 mm<EFL<45 mm.

In another aspect of the present disclosure, an eyepiece is provided. The eyepiece includes a lens. The lens has a first surface corresponding to an eye side and a second surface opposite to the first surface. The first surface is a Fresnel structure surface. The Fresnel structure surface includes multiple annular sections arranged in sequence to form a serrated surface, and each of the multiple annular sections is composed of a working surface and a non-working surface. A center thickness CT of the lens and an effective outer diameter DY of the lens satisfy: $0.08 < CT/DY < 0.4$.

According to implementations of the present disclosure, the effective focal length EFL of the lens may satisfy: 35 mm<EFL<45 mm, for example, $37.07 \text{ mm} \leq EFL \leq 45 \text{ mm}$.

According to the implementations of the present disclosure, the center thickness CT of the lens and the effective outer diameter DY of the lens may satisfy: $0.08 < CT/DY < 0.4$, for example, $0.28 \leq CT/DY \leq 0.34$.

According to the implementations of the present disclosure, on the Fresnel structure surface of the first surface of the lens, a width $z_i$ of an $i^{th}$ annular section of annular sections arranged from an optical axis to an edge may satisfy: $0.08 \text{ mm} \leq z_i \leq 3.5 \text{ mm}$, for example, $0.5 \text{ mm} \leq z_i \leq 1 \text{ mm}$, and a depth $d_i$ of the $i^{th}$ annular section may satisfy: $0 \text{ mm} < d_i \leq 0.5 \text{ mm}$, for example, $0.002 \text{ mm} < d_i \leq 0.49 \text{ mm}$.

According to the implementations of the present disclosure, in a case where a direction of the optical axis extending from an eye to a center of a screen is positive, an optical-axis distance SAG1 between an intersection point of the first surface with the optical axis and an effective radius endpoint of the first surface, and the effective outer diameter DY of the lens may satisfy: $-0.28 \leq SAG1/DY \leq 0$, for example, $-0.09 \leq SAG1/DY \leq -0.06$.

According to the implementations of the present disclosure, in a case where the direction of the optical axis extending from the eye to the center of the screen is positive, an optical-axis distance SAG2 between an intersection point of the second surface with the optical axis and an effective radius endpoint of the second surface, and the effective outer diameter DY of the lens may satisfy: $-0.4 \leq SAG2/DY \leq -0.2$, for example, $-0.35 \leq SAG2/DY \leq -0.33$.

According to the implementations of the present disclosure, the multiple annular sections in the Fresnel structure surface of the first surface of the lens are arranged on a base surface, and the base surface is a concave surface.

According to the implementations of the present disclosure, a radius R1 of curvature of the base surface where the multiple annular sections are located and the effective focal length EFL of the lens satisfy: $-2.9 < R1/EFL < -0.4$, for example, $-2.46 \leq R1/EFL \leq -1.66$.

According to the implementations of the present disclosure, each of the annular sections may include a working surface and a non-working surface.

According to the implementations of the present disclosure, the second surface is an aspheric curved surface.

In yet another aspect of the present disclosure, a display device that may be equipped with the above-mentioned eyepiece is provided.

In yet another aspect of the present disclosure, a head-mounted VR display device that may be equipped with the above-mentioned eyepiece is provided.

Beneficial Effects

The present disclosure provides an eyepiece. The eyepiece includes a lens. The lens has a concave Fresnel surface shape to effectively correct system aberrations and at the same time reduce an influence of the deflection factor caused by the eyeball rotation, thereby effectively improving the image effect of the eyepiece.

BRIEF DESCRIPTION OF THE DRAWINGS

The above and other advantages of implementations of the present disclosure will become apparent from the detailed description with reference to the following accompanying drawings. The accompanying drawings are intended to illustrate the exemplary implementations of the present disclosure rather than limiting them. In the accompanying drawings.

DETAILED DESCRIPTION OF EMBODIMENTS

Figure 1:
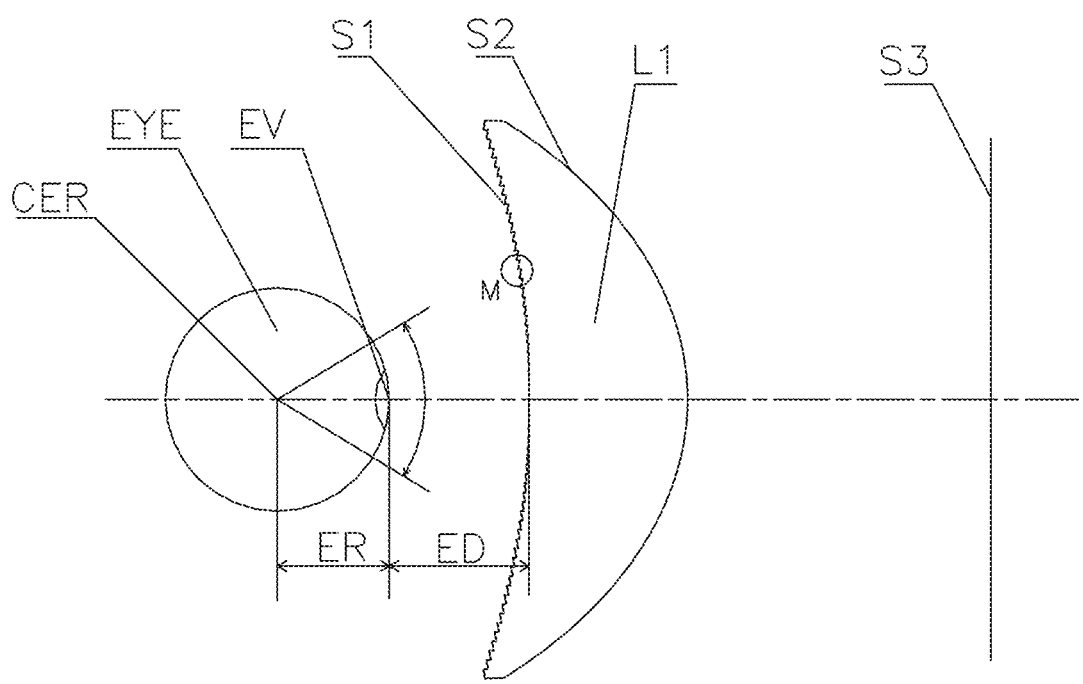
FIG. 1 shows a schematic structural diagram of an eyepiece according to a first embodiment of the present disclosure.

For a better understanding of the present disclosure, various aspects of the present disclosure will be described in more detail with reference to the accompanying drawings. It should be understood that the detailed description is merely an illustration for exemplary implementations of the present disclosure rather than a limitation to the scope of the present disclosure in any way. Throughout the specification, the same reference numerals refer to the same elements. The expression "and/or" includes any and all combinations of one or more of the associated listed items.

In the accompanying drawings, the thickness, size and shape of the lens have been slightly exaggerated for the convenience of explanation. However, it should be understood that the sizes of the components are not limited by the accompanying drawings but may be appropriately adjusted within a certain range. Specifically, shapes of spherical surfaces or aspheric surfaces shown in the accompanying drawings are shown by way of examples. That is, shapes of spherical surfaces or aspheric surfaces are not limited to the shapes of the spherical surfaces or the aspheric surfaces shown in the accompanying drawings. The accompanying drawings are merely illustrative and not strictly drawn to scale.

In addition, the paraxial area refers to an area in proximity to the optical axis.

It should be further understood that the terms "comprising," "including," "having" and variants thereof, when used in this specification, specify the presence of stated features, entities, elements and/or components, but do not exclude the presence or addition of one or more other features, entities, elements, components and/or combinations thereof. In addition, expressions, such as "at least one of," when preceding a list of features, modify the entire list of features rather than an individual element in the list. Further, the use of "may," when describing implementations of the present disclosure, relates to "one or more implementations of the present disclosure." In addition, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

An eyepiece according to exemplary embodiments of the present disclosure includes a lens. The lens has a first surface and a second surface opposite to the first surface. The first surface is a corresponding surface in an eye side, and the second surface is a corresponding surface in a display element side.

In the exemplary implementations, the first surface of the lens is a Fresnel structure surface, and the second surface is an aspheric curved surface. The Fresnel structure surface may include multiple annular sections arranged in sequence to form a serrated surface. Each of the annular sections may include a working surface and a non-working surface.

In the exemplary implementations, the multiple annular sections in the Fresnel structure surface of the first surface of the lens are arranged on a base surface, and the base surface is a concave surface.

In the exemplary implementations, an effective focal length EFL of the lens may satisfy: 35 mm<EFL<45 mm, and more specifically, may further satisfy: 37.07 mm≤EFL≤45 mm. An eyepiece system satisfying this condition may achieve a better sense of immersion.

In the exemplary implementations, a radius R1 of curvature of the base surface where the multiple annular sections are located and the effective focal length EFL of the lens satisfy: −2.9<R1/EFL<−0.4, and more specifically, may further satisfy: −2.46≤R1/EFL≤−1.66.

In the exemplary implementations, a center thickness CT of the lens and an effective outer diameter. DY of the lens may satisfy: 0.08<CT/DY<0.4, and more specifically, may further satisfy: 0.28≤CT/DY≤0.34. An eyepiece system satisfying this condition may achieve a better sense of immersion.

In the exemplary implementations, on the Fresnel structure surface of the first surface of the lens, a width zi of an $i^{th}$ annular section of annular sections arranged from an optical axis to an edge may satisfy: 0.08 mm≤zi≤3.5 mm, and more specifically, may further satisfy: 0.5 mm≤zi≤1 mm, and a depth di of the $i^{th}$ annular section may satisfy: 0 mm<di≤0.5 mm, and more specifically, may further satisfy: 0.002 mm<di≤0.49 mm. Such a configuration may well correct a spherical aberration of the optical system and reduce a sense of lattice while watching a virtual screen with the eyes.

In the exemplary implementations, in a case where a direction of the optical axis extending from an eye to a center of a screen is positive, an optical-axis distance SAG1 between an intersection point of the first surface with the optical axis and an effective radius endpoint of the first surface, and the effective outer diameter DY the lens may satisfy: −0.28≤SAG1/DY≤0, and more specifically, may further satisfy: −0.99≤SAG1/DY≤−0.06. Such a configuration may reduce an optical field curvature aberration introduced by the eyeball rotation and improve the image quality of the eyepiece.

In the exemplary implementations, in a case where the direction of the optical axis extending from the eye to the center of the screen is positive, an optical-axis distance SAG2 between an intersection point of the second surface with the optical axis and an effective radius endpoint of the second surface, and the effective outer diameter DY of the lens may satisfy: −0.4≤SAG2/DY≤−0.2, and more specifically, may further satisfy: −0.35≤SAG2/DY≤−0.33. Such a configuration may correct a spherical aberration of the optical system and improve an image quality.

Features, principles and other aspects of the present disclosure will be described below in detail with reference to FIGS. 1-4 in combination with specific embodiments.

First Embodiment

The first embodiment of the present disclosure provides an eyepiece. Referring to FIG. 1, the eyepiece according to first embodiment of the present disclosure is provided with a lens L1 and a photosensitive element.

As shown in FIG. 1, the pupil center of the eye EYE is EV, the eyeball rotation center is CER, the optical-axis distance between the eyeball rotation center CER and the pupil center EV is ER, and the optical-axis distance from the eye pupil center EV to the first surface S1 is ED.

The lens L1 may include a first surface S1 and a second surface S2 opposite to the first surface S1. The first surface S1 is a corresponding surface in an eye side, and the second surface S2 is a corresponding surface in a display element side. In addition, the first surface S1 of the lens is a Fresnel structure surface, and the second surface S2 is an aspheric curved surface.

Figure 2:
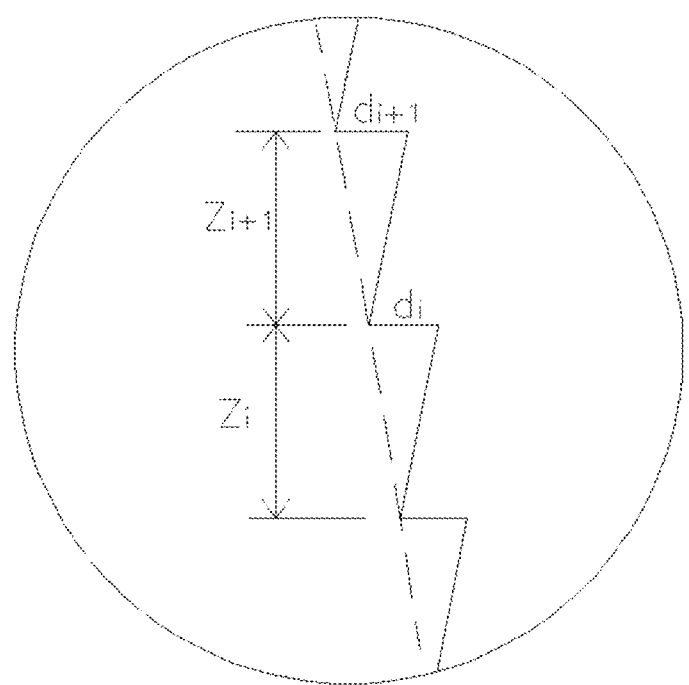
FIG. 2 shows a partial enlarged view of a Fresnel structure surface according to the first embodiment.

The Fresnel structure surface may include multiple annular sections Ci (where i is a natural number) arranged in sequence to form a serrated surface. The serrated surface of the Fresnel structure surface is shown in detail in FIG. 2. As shown in FIG. 2, the $i^{th}$ annular section and the $(i+1)^{th}$ annular section of annular sections arranged from the optical axis to the edge may have a vertical spacing zi and the vertical spacing between every two adjacent annular sections is equal. In this embodiment, zi=1.00 mm. The annular section Ci in the Fresnel structure surface of the first surface S1 of the lens L1 is arranged on the base surface S1', and the base surface S1' is a concave surface. The depth of the $i^{th}$ annular section of the annular sections arranged from the optical axis to the edge is di, which may satisfy: 0.01 mm≤di≤0.49 mm.

Each annular section Ci may include a working surface Sa and a non-working surface Sb. The working surface Sa may satisfy the following conditional expression (1).

$$x = \frac{ch^2}{1+\sqrt{1-(k+1)c^2h^2}} + \sum Aih^i \quad (1)$$

Here, h is the height from any point on the working surface Sa to the optical axis, c is the vertex curvature, k is the conic constant, and Ai is the $i^{th}$ order correction coefficient of the aspheric surface.

In the first embodiment, the effective focal length EFL of the lens satisfies: EFL=37.07 mm.

In the first embodiment, the radius R1 of curvature of the base surface where the multiple annular sections are located and the effective focal length EFL of the lens satisfy: R1/EFL=−2.19.

In the first embodiment, the optical-axis distance SAG1 between an intersection point of the first surface S1 of the lens with the optical axis and an effective radius endpoint of the first surface S1, and the effective outer diameter DY of the lens satisfy: SAG1/DY=−0.09.

In the first embodiment, the optical-axis distance SAG2 between an intersection point of the second surface S2 of the lens with the optical axis and an effective radius endpoint of the second surface S2, and the effective outer diameter DY of the lens satisfy: SAG2/DY=−0.33.

In the first embodiment, the center thickness CT of the lens and the effective outer diameter DY of the lens satisfy: CT/DY=0.28.

To sum up, the eyepiece according to the first embodiment may obtain a better imaging effect while satisfying the requirements for miniaturization and lightness and thinness of the VR eyepiece.

Second Embodiment

An eyepiece according to a second embodiment of the present disclosure is described below with reference to FIG. 3. The eyepiece described in the second embodiment and the following embodiments is the same in arrangement and structure as the eyepiece described in the first embodiment. For the purpose of brevity, the description of parts similar to those in the first embodiment will be omitted.

Figure 3:
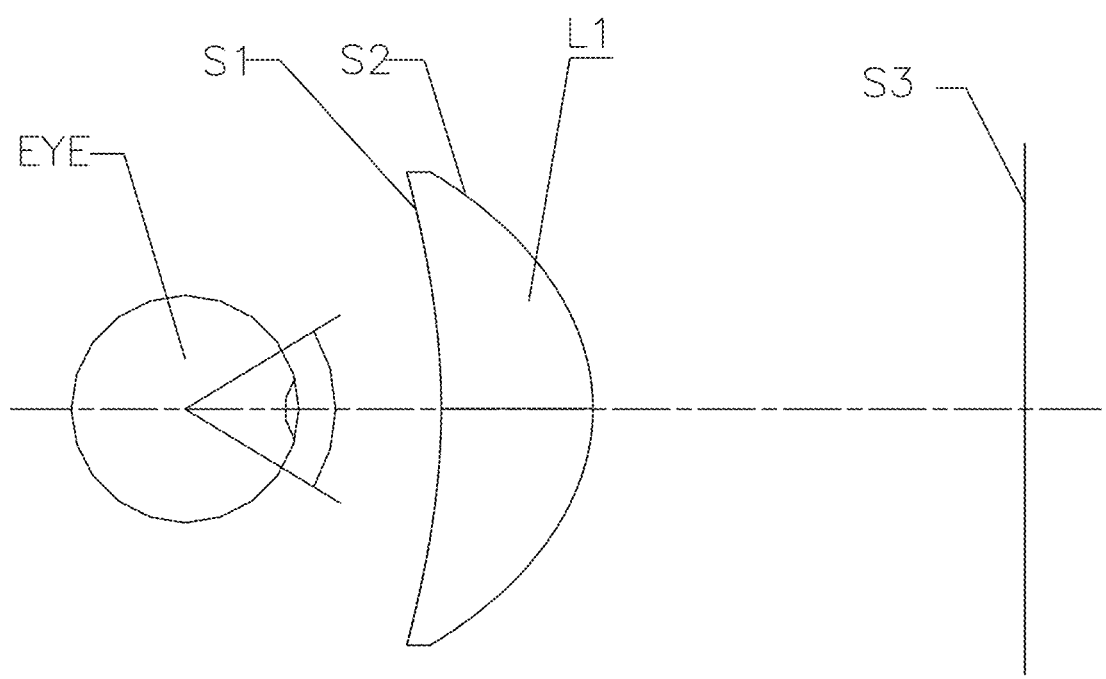
FIG. 3 shows a schematic structural view of an eyepiece of according to a second embodiment of the present disclosure.

FIG. 3 shows a schematic structural diagram of the eyepiece according to the second embodiment, of the present disclosure. As shown in FIG. 3, the eyepiece according to the second embodiment includes a lens L1 and a photosensitive element.

In the second embodiment, the vertical distance zi between the $i^{th}$ annular section and the $(i+1)^{th}$ annular section of annular sections arranged from the optical axis of the Fresnel structure surface to the edge is, for example, 0.5 mm. The depth of the $i^{th}$ annular section of the annular sections arranged from the optical axis of the Fresnel structure surface to the edge is di and may satisfy: 0.002 mm≤di≤0.05 mm.

In the second embodiment, the effective focal length EFL of the lens satisfies: EFL=45 mm.

In the second embodiment, the radius R1 of curvature of the base surface where the multiple annular sections are located and the effective focal length EFL of the lens satisfy: R1/EFL=−1.66.

In the second embodiment, the optical-axis distance SAG1 between an intersection point of the first surface S1 of the lens with the optical axis, and an effective radius endpoint of the first surface S1, and the effective outer diameter DY of the lens satisfy: SAG1/DY=−0.07.

In the second embodiment, the optical-axis distance SAG2 between an intersection point of the second surface S2 of the lens with the optical axis and an effective radius endpoint of the second surface S2, and the effective outer diameter DY of the lens satisfy: SAG2/DY=−0.34.

In the second embodiment, the center thickness CT of the lens and the effective outer diameter DY of the lens satisfy: CT/DY=0.32.

To sum up, the eyepiece according to the second embodiment may obtain a better imaging effect while satisfying the requirements for miniaturization and lightness and thinness of the VR eyepiece.

Third Embodiment

Figure 4:
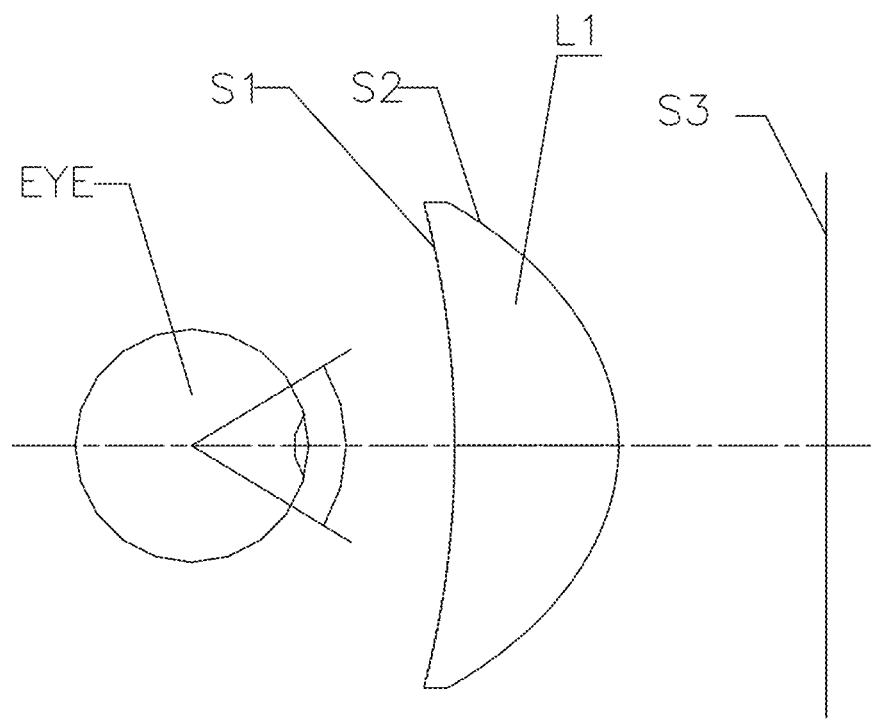
FIG. 4 shows a schematic structural view of an eyepiece according to a third embodiment of the present disclosure.

An eyepiece according to a third embodiment of the present disclosure is described below with reference to FIG. 4. FIG. 4 shows a schematic structural diagram of the eyepiece according to the third embodiment of the present disclosure. As shown in FIG. 4, the eyepiece according to the third embodiment includes a lens L1 and a photosensitive element.

In the third embodiment, the vertical distance zi between the $i^{th}$ annular section and the $(i+1)^{th}$ annular section of annular sections arranged from the optical axis of the Fresnel structure surface to the edge is, for example, 1.00 mm. The depth of the $i^{th}$ annular section of the annular sections arranged from the optical axis of the Fresnel structure surface to the edge is di and may satisfy: 0.02 mm≤di≤0.13 mm.

In the third embodiment, the effective focal length. EFL of the lens satisfies: EFL=40 mm.

In the third embodiment, the radius R1 of curvature of the base surface where the multiple annular sections are located and the effective focal length EFL of the lens satisfy: R1/EFL=−2.46.

In the third embodiment, the optical-axis distance SAG1 between an intersection point of the first surface S1 of the lens with the optical axis and an effective radius endpoint of the first surface S1, and the effective outer diameter DY of the lens satisfy: SAG1/DY=−0.06.

In the third embodiment, the optical-axis distance SAG2 between an intersection point of the second surface S2 of the lens with the optical axis and an effective radius endpoint of the second surface S2, and the effective outer diameter DY of the lens satisfy: SAG2/DY=−0.35.

In the third embodiment, the center thickness CT of the lens and the effective outer diameter DY of the lens satisfy: CT/DY=0.34.

To sum up, the eyepiece according to the third embodiment may obtain a better imaging effect while satisfying the requirements for miniaturization and lightness and thinness of the VR eyepiece.

The relationship between the parameters of the lens in the first embodiment to the third embodiment is shown in Table 1 below.

TABLE 1

| | Conditional expression | | | | | | |
|---|---|---|---|---|---|---|---|
| Embodiment | EFL(mm) | zi(mm) | di(mm) | R1/EFL | SAG1/DY | SAG2/DY | CT/DY |
| 1 | 37.07 | 1.00 | 0.01-0.49 | −2.19 | −0.09 | −0.33 | 0.28 |
| 2 | 45.00 | 0.50 | 0.002-0.05 | −1.66 | −0.07 | −0.34 | 0.32 |
| 3 | 40.00 | 1.00 | 0.02-0.13 | −2.46 | −0.06 | −0.35 | 0.34 |

The present disclosure further provides a display device. The display device may be a virtual reality display system, for example. The display device may be equipped with the eyepiece as described in the above embodiments.

The exemplary embodiments of the present disclosure have been described above with reference to the accompanying drawings. It should be understood by those skilled in the art that the above embodiments are only examples for illustrative purposes and are not intended to limit the scope of the present disclosure. Any modifications, equivalent replacements, etc. made within the scope of the teachings and claims of the present disclosure should be included within the scope of protection claimed herein.

What is claimed is:

1. An eyepiece, comprising a lens, having a first surface corresponding to an eye side and a second surface opposite to the first surface,
    wherein the first surface is a Fresnel structure surface, and the second surface is an aspheric curved surface;
    the Fresnel structure surface comprises a plurality of annular sections arranged in sequence to form a serrated surface; and
    an effective focal length EFL of the lens satisfies: 35 mm<EFL<45 mm,
    wherein the plurality of annular sections in the Fresnel structure surface of the first surface of the lens are arranged on a base surface, and the base surface is a concave surface.

2. The eyepiece according to claim 1, wherein each of the plurality of annular sections is composed of a working surface and a non-working surface.

3. The eyepiece according to claim 1, wherein,
    on the Fresnel structure surface of the first surface of the lens, a width zi of an $i^{th}$ annular section of annular sections arranged from an optical axis to an edge satisfies: 0.08 mm≤zi≤3.5 mm.

4. The eyepiece according to claim 3, wherein a depth di of the $i^{th}$ annular section satisfies: 0 mm<di≤0.5 mm.

5. The eyepiece according to claim 1, wherein −0.28≤SAG1/DY≤0,
    wherein SAG1 represents an optical-axis distance between an intersection point of the first surface with the optical axis and an effective radius endpoint of the first surface, in a case where a direction of the optical axis extending from an eye to a center of a screen is positive; and
    DY represents an effective outer diameter of the lens.

6. The eyepiece according to claim 1, wherein −0.4≤SAG2/DY≤−0.2,
    wherein SAG2 represents an optical-axis distance between an intersection point of the second surface with the optical axis and an effective radius endpoint of the second surface, in a case where a direction of the optical axis extending from an eye to a center of a screen is positive; and
    DY represents an effective outer diameter of the lens.

7. The eyepiece according to claim 1, wherein a center thickness CT and an effective outer diameter DY of the lens satisfy: 0.08≤CT/DY≤0.4.

8. The eyepiece according to claim 1, wherein a radius R1 of curvature of the base surface and the effective focal length EFL of the lens satisfy: −2.9<R1/EFL<−0.4.

9. An eyepiece, comprising a lens, having a first surface corresponding to an eye side and a second surface opposite to the first surface,
    wherein the first surface is a Fresnel structure surface;
    the Fresnel structure surface comprises a plurality of annular sections arranged in sequence to form a serrated surface, and each of the plurality of annular sections is composed of a working surface and a non-working surface; and
    a center thickness CT of the lens and an effective outer diameter DY of the lens satisfy: 0.08<CT/DY<0.4,
    wherein the plurality of annular sections in the Fresnel structure surface are arranged on a base surface, and the base surface is a concave surface.

10. The eyepiece according to claim 9, wherein a radius R1 of curvature of the base surface and an effective focal length EFL of the lens satisfy: −2.9<R1/EFL<−0.4.

11. The eyepiece according to claim 9, wherein the second surface is an aspheric curved surface.

12. The eyepiece according to claim 9, wherein, on the Fresnel structure surface of the first surface of the lens, a width zi of an $i^{th}$ annular section of annular sections arranged from an optical axis to an edge satisfies: 0.08 mm≤zi≤3.5 mm.

13. The eyepiece according to claim 12, wherein a depth di of the $i^{th}$ annular section satisfies: 0 mm<di≤0.5 mm.

14. The eyepiece according to claim 9, wherein −0.28≤SAG1/DY≤0,
wherein SAG1 represents an optical-axis distance between an intersection point of the first surface with the optical axis and an effective radius endpoint of the first surface, in a case where a direction of the optical axis extending from an eye to a center of a screen is positive; and
DY represents the effective outer diameter of the lens.

15. The eyepiece according to claim 9, wherein −0.4≤SAG2/DY≤−0.2,
wherein SAG2 represents an optical-axis distance between an intersection point of the second surface with the optical axis and an effective radius endpoint of the second surface, in a case where a direction of the optical axis extending from an eye to a center of a screen is positive; and
DY represents the effective outer diameter of the lens.

16. A display device, comprising an eyepiece,
wherein the eyepiece comprising a first lens or a second lens,
wherein the first lens has a first surface corresponding to a first eye side and a second surface opposite to the first surface,
wherein the first surface is a first Fresnel structure surface, and the second surface is an aspheric curved surface;
the first Fresnel structure surface comprises a plurality of first annular sections arranged in sequence to form a first serrated surface; and
an effective focal length EFL of the first lens satisfies: 35 mm<EFL<45 mm;
wherein the plurality of first annular sections in the first Fresnel structure surface are arranged on a first base surface, and the first base surface is a concave surface;
wherein the second lens has a third surface corresponding to a second eye side and a fourth surface opposite to the third surface,
wherein the third surface is a second Fresnel structure surface;
the second Fresnel structure surface comprises a plurality of second annular sections arranged in sequence to form a second serrated surface, and each of the plurality of second annular sections is composed of a working surface and a non-working surface; and
a center thickness CT of the second lens and an effective outer diameter DY of the second lens satisfy: 0.08<CT/DY<0.4,
wherein the plurality of second annular sections in the second Fresnel structure surface are arranged on a second base surface, and the second base surface is a concave surface.

17. The display device according to claim 16, wherein the display device is a head-mounted virtual reality display device.

* * * * *